United States Patent [19]

Tucker et al.

[11] 4,449,393

[45] May 22, 1984

[54] ENERGY (TEST) DOOR

[76] Inventors: Jeffrey C. Tucker, 4216 - 50th St., Suite F, Lubbock, Tex. 79413; H. Dale Edmundson, P.O. Box 1416, Grants, N. Mex. 87020; David L. Wigley; Mark F. Vallo, both of 4216 - 50th St., Suite F, Lubbock, Tex. 79413

[21] Appl. No.: 322,019

[22] Filed: Nov. 16, 1981

[51] Int. Cl.³ .............................................. G01M 3/26
[52] U.S. Cl. .......................................... 73/40; 49/463; 52/173 R
[58] Field of Search ..................... 73/40; 98/1.5, 33 R; 49/463, 425; 52/173 R, 173 DS

[56] References Cited

U.S. PATENT DOCUMENTS

| | | | |
|---|---|---|---|
| 3,347,025 | 10/1967 | Wiley | 98/33 R |
| 3,802,168 | 4/1974 | Deckas | 98/33 A |
| 3,858,355 | 1/1975 | Root | 49/463 |
| 4,089,135 | 5/1978 | Beny et al. | 49/425 |
| 4,241,871 | 12/1980 | Newell | 98/1.5 |
| 4,287,815 | 9/1981 | Henderson | 49/463 |
| 4,363,236 | 12/1982 | Meyers | 73/40 |

FOREIGN PATENT DOCUMENTS 1034433 11/1978 Canada ........................... 52/173 DS

OTHER PUBLICATIONS

National Geographic, Special Report—Energy, Feb. 1981, pp. 48 and 49, "A Visit From House Doctors".
American Society of Heating, Refrigerating and Air-Conditioning Engineers, Inc., 345 East 47th Street, New York, NY 10017; to appear in ASHRAE Transactions 1979, vol. 85, Part 1; "Approaches to Evaluation of Air Infiltration Energy Losses in Buildings" by Ake K. Blomsterberg and David T. Harrje.

Primary Examiner—Daniel M. Yasich
Attorney, Agent, or Firm—Wendell Coffee

[57] ABSTRACT

A test door has wheels mounted thereon so that one person can easily roll the door to a doorway of a house to be installed. The test door has a fan permanently mounted thereon. The test door has panels or flaps, which slide against the doorway to seal the doorway against leaks. The door has mounted thereon a speed control device, and a tachometer to determine the speed of the fan. The door also has mounted thereon a differential pressure gauge so that the pressure difference from the inside to outside of the door can be measured. Therefore, to determine the amount of leakage of air from a house, the door is rolled to the doorway and quickly placed in the doorway by sliding the flaps out until they seal the doorway. Then by starting the fan, a determination is made as to the amount of air loss for different fan speeds and differential pressures.

1 Claim, 5 Drawing Figures

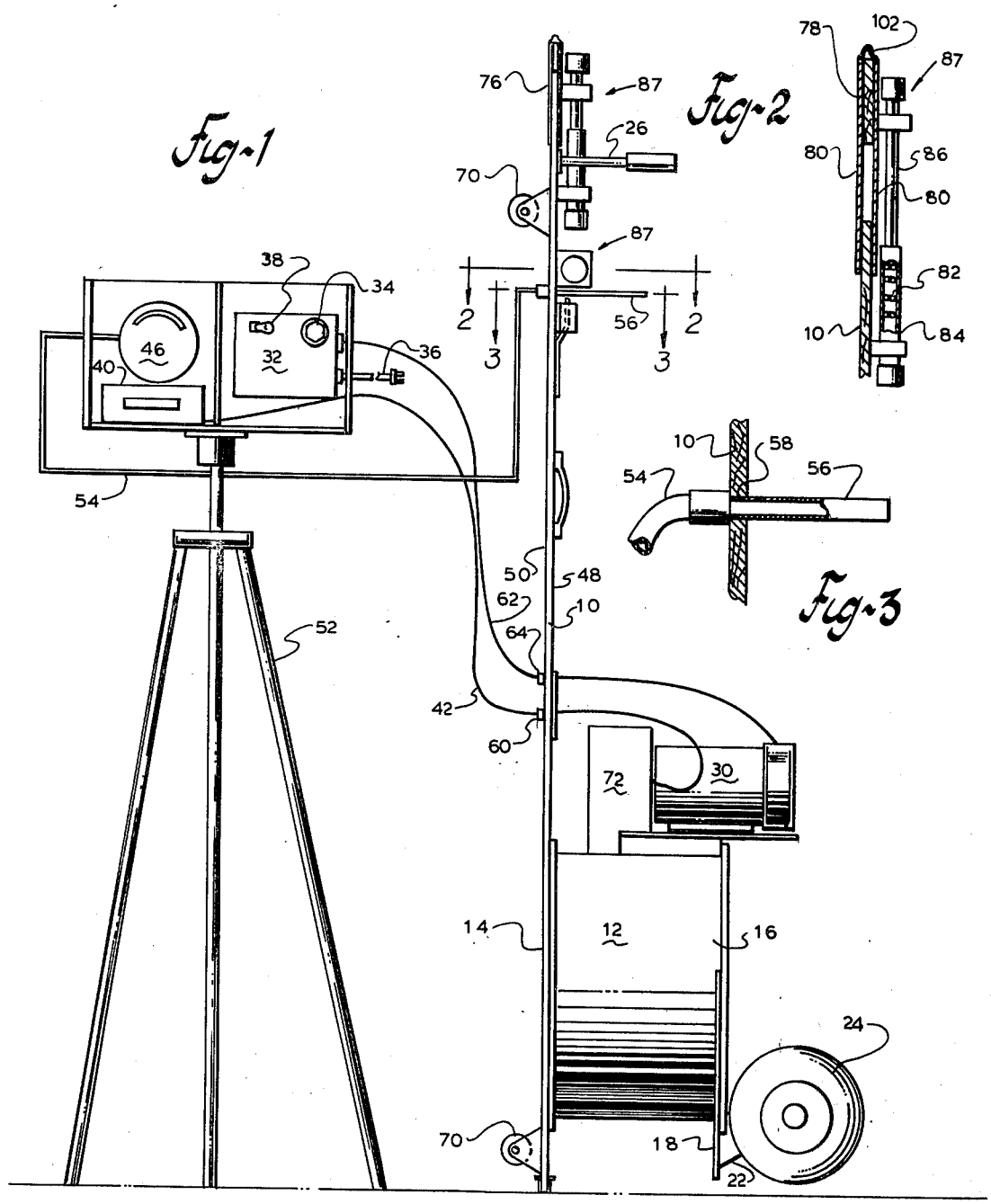

ENERGY (TEST) DOOR

BACKGROUND OF THE INVENTION

1. Field of the Invention

This invention relates to energy conservation, and more particularly to a test door for measuring the air leakage of a house.

2 Description of the Prior Art

Before this invention was made, it was known that the air leakage of a house could be determined by closing all the windows and doors of the house except for one door, and placing a special test door in that one doorway. Then it was known, that a fan placed in the special door could be used and differential pressures could be measured to determine the air leakage. However, the prior art contemplated a laboratory-like set-up, where each of the individual elements were separate and kept separate and used separate. I.e., there was no integration between the fan, the closure members, the tachometer, the differential pressure meters and the like.

SUMMARY OF THE INVENTION

1. New and Different Function

According to this invention, a simple single unit is provided for determining the air leakage of a house. The people that make this determination must be skilled personnel, and their time is valuable. This invention is to make the amount of time they spend in setting up and gathering the data as short as possible.

Specifically, wheels are mounted permanently on the door. The mounting of the wheels on the door does not hinder or distract in any way from the use of the door when it is in place, nor in the storage of the door between jobs. Therefore, the necessity of having two people to carry the door on dollies, or by hand, is eliminated.

The fan speed control, and differential pressure gauge, and the tachometer are attached to the door, so that all that is necessary is to attach an electrical power cord into an outlet, which will be present at the house.

Sliding flaps on the door are quickly extended to seal the door into the doorway.

Therefore, the manpower hours to make an air leakage measurement upon a house is greatly decreased.

Thus it may be seen that the function of the total invention far exceeds the sum of the functions of the individual elements such as wheels, fan housings, meters, etc.

2. Objects of this Invention

An object of this invention is to conserve energy.

Another object of this invention is to measure the air leakage of a house.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require many highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a side elevational view of a door according to this invention with the meters and control on a separate tripod.

FIG. 2 is a cross-sectional detail taken substantially on line 2—2 of FIG. 1 showing a spring-biased sliding panel.

FIG. 3 is a sectional view taken substantially on line 3—3 of FIG. 1 showing details of the outside pressure probe.

DESCRIPTION OF THE PREFERRED EMBODIMENTS

Figure 4:
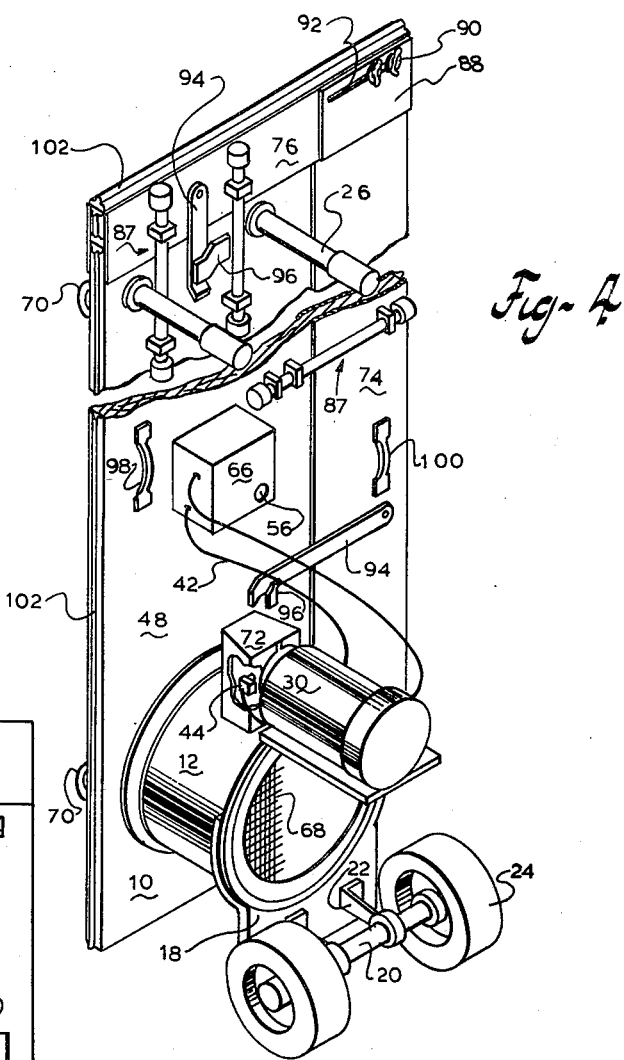
FIG. 4 is a perspective view of the door having the meters and control mounted on the door.

Referring to the drawing, it may be seen that a main unit of the door is main panel 10. Fan housing 12 is rigidly attached to the main panel 10. The fan housing has door side 14 and yoke side 16. The door side 14 is securely attached as by screws or bolts (not shown) to the main panel 10.

Yoke 18 is securely attached by bolts or welding (not shown) to the yoke side 16. Axle 20 is securely attached to brackets 22 attached to the yoke 18. Wheels 24 are journaled to the axle 20. (FIG. 4)

Post 26 are secured to the main panel 10 near the upper portion thereof. Since the fan housing 12 is on the bottom portion of the main panel and the yoke 18 depends downward therefrom, the post 26 may be used as hand grips to wheel the door around a hand truck. Therefore, it may be seen that the housing 12 must be very sturdy inasmuch as not only does it support the fan 28 journaled therein, but also motor 30 mounted above it. Also, when the door is being moved from one location to another, the entire door structure itself is supported by the fan housing 12.

The motor 30 is a variable-speed motor of conventional design. It is connected to speed controller 32. Therefore, by rotation of control knob 34 on controller 32 the speed of the motor 30 is controlled. Electrical connection 36 provides a convenient means for supplying power to the unit. As will be understood by those having ordinary skill in electric motors and electric motors connected to fans, the electric power supplied through the connection 36 will be controlled by the controller 32 to control the speed of the motor 30. Power switch 38 turns the motor on, forward, reverse, and off. The speed at which the motor runs is indicated by tachometer 40. The tachometer is connected by wire 42 to sensing element 44 mounted upon the pulley attached to the motor 30. The pulley (not shown) is transmission means by which power from the motor 30 is transmitted to the fan 28.

Differential pressure gauge 46 determines the pressure difference from the outside face 48 to the inside face 50 of the door. As illustrated in FIGS. 1 and 3, the control 32, tachometer 40, and differential pressure gauge 46 are mounted upon tripod 52. The tripod 52 is set up inside of the door, i.e. inside of the house where the measurement is being taken. Therefore, tube 54 extends from the differential pressure gauge 46 to probe 56 which extends through hole 58 through the main panel 10 of the door. The tachometer wire 42 in FIG. 1 is connected to connector 60 which plugs into a plug upon the inside face 50 of the door. Likewise, power lead 62 extends from the controller 32 to connector 64 which connects to a plug on the inside of the door and is lead then to the motor 30.

Figure 5:
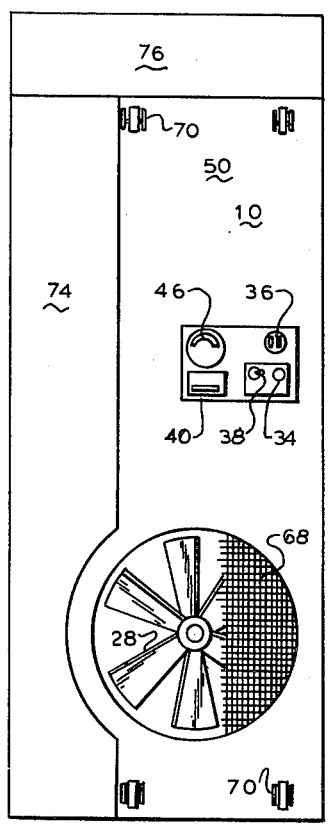
FIG. 5 is an inside front elevational view of the door of FIG. 4.

FIGS. 4 and 5 illustrate the controller 32, tachometer 40, and differential pressure meter 46 connected into the face of the door. The connection will be with the inside face 50 of the door being flush and the meters and controllers mounted so that they are flush or nearly so with the inside face 50 of the door. In this instance, the electrical connection 36 is slightly recessed so that it does not protrude from the inside face of the door. The equipment is protected by equipment housing 66 which projects from the outside face 48 of the door. The posts 26 are of sufficient length that they protect the housing 66. Probe 56 terminates at the outside face of the equipment housing 66 as seen in FIG. 4.

The fan housing 12 and wheels 24 project from the outside face 48 of the main panel 10. Fan 28 within the housing 12 is protected by grill or screen 68 on both the inside and outside. Those having ordinary skill in the testing arts, will understand that the fan is calibrated so that for each specified speed of the fan and for each differential pressure of the fan, a specific known amount of air is delivered.

Four rollers 70 are mounted to the inside face 50 of the main panel 10 of the door. Therefore, for storage of the door, when not in use, the door may be laid over on its inside face 50 and rolled along any flat surfce by the rollers 70. When being transported from one location to another, it may be tilted back so that the outside face 48 is inclined downward and moved as a hand truck rolling upon the wheels 24 by an operator holding the post 26.

The belt, which is a part of the transmission means from the motor 30 to the fan 28 within the housing 12 and the pulley is covered by transmission housing 72.

Side flap 74 is slidingly attached to one side of the main door panel 10. Top flap 76 is slidingly connected to the top of main panel 10. Each of these flaps has core 78, which is the same thickness as the main panel 10. On each side of the core 78 there is a metal plate or sheet 80 which is securely attached as by screws (not shown) to the core 78 and which slidingly straddle the main panel 10. The flaps are spring-biased outward by springs 82 contained within tubes 84 which are securely attached to the main panel 10. The springs 82 bear against plungers 86 which are securely attached to the flaps. Springs 82, tubes 84, and plungers 86 form spring means 87 for biasing the flaps in place for filling the doorway and preventing air leaks around the door. Corner flap 88 is attached to top flap 76 immediately above side flap 74. It is held in place by thumb screws 90. The corner flap 88 can slide inasmuch as slot 92 straddle the bolts which have the thumb screws 90 attached thereto. Bolts extend into the core 78 of the top flap 76.

There are two spring means for the top flaps 76 and two spring means for the side flaps 74 although in the drawing only one of the spring means 87 for side flap 74 is illustrated. To maintain the flaps in a retracted position when the door is not in use, pivot bar 94 is pivoted to the core 78 of each of the flaps. The pivot bar 94 fits behind latch 96 to hold the flaps in a retracted position.

Handle 98 is attached to the main panel 10 away from the side flap 74 and and a handle 100 is attached to the side flap 74. Rubber seal 102 is attached along the exposed edge of the main panel 10 and also along the top flap 76 and the exposed edge of the side flap 74.

OPERATION

Assuming that the door is resting upon the inside face 50 within the truck or other vehicle, it can be pulled from the truck rolling along the rollers 70. Then it is pulled to the upright position. Then the door is rolled like a hand truck to the doorway of the house where it will be used. At the doorway of the house, the flaps 74 and 76 will be released by removing the pivot bar 94 from the latches 96. This will permit the spring means 87 to move the top flap 76 against the top of the doorway, and the side flap 74 against the side of the doorway. The rubber seal 102 will be pressed by the spring means 87 securely against the side and top of the doorway to form an air seal having negligible air leaks. The corner at the junction of the side flap 74 and top flap 76 is closed by loosening the thumb screws 90 and sliding the corner flap 88 into the corner and then tightening the thumb screws 90.

The operator then moves within the house and connects the speed controller 32 to a source of electrical power, which will be readily available within the house. In a set up according to FIG. 1 the meters are to be mounted on tripid 52 and connected to the inside face 50 of the door. Then the motor 30 is started and set at a predetermined speed and the differential pressure reading determined by differential pressure gauge 46. Then the speed will be changed by rotating the control knob 34 to a different speed and again, and as determined by the tachometer 40. Then a reading is made of the differential pressure at that speed.

Upon completion of the readings, additional tests can be done with the unit. For example: by the use of powder or smoke, it can be determined where the majority of the leaks within the house are occurring.

Thus it may be seen, that a simple device or method is provided for quickly determining the air leaks of a house.

The embodiments shown and described are is only exemplary. We do not claim to have invented all the parts, elements or steps described. Various modifications can be made in the construction, material, arrangement, and operation, and still be within the scope of our invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| 10 | main panel | 58 | hole |
|---|---|---|---|
| 12 | fan housing | 60 | connector, tach |
| 14 | door side | 62 | power lead |
| 16 | yoke side | 64 | connector, power |
| 18 | yoke | 66 | equipment housing |
| 20 | axle | 68 | screen |
| 22 | brackets | 70 | rollers |
| 24 | wheels | 72 | transmission housing |
| 26 | post | 74 | side flap |
| 28 | fan | 76 | top flap |
| 30 | motor | 78 | core |
| 32 | speed controller | 80 | metal plate |
| 34 | control knob | 82 | springs |
| 36 | electrical connection | 84 | tubes |
| 38 | power switch | 86 | plungers |
| 40 | tachometer | 87 | spring means |

| | | | |
|---|---|---|---|
| 42 | wire, tach | 88 | corner flap |
| 44 | sensing element | 90 | thumb screws |
| 46 | differential pressure gauge | 92 | slot |
| | | 94 | pivot bar |
| 48 | outside face | 96 | latch |
| 50 | inside face | 98 | handle |
| 52 | tripod | 100 | handle |
| 54 | tube | 102 | rubber seal |
| 56 | probe | | |

We claim as our invention:

1. A door adapted to be mounted in the doorway of a house comprising:
 a. a main panel having
   i. an inside face, and
   ii. an outside face
 b. a fan housing attached to the outside face of the main panel,
 c. a fan housing having a
   i. a yoke side, and
   ii. a door side which is the side attached to the main panel,
 d. a yoke attached to the yoke side of the fan housing,
 e. an axle attached to the yoke,
 f. wheels journaled to said axle,
 g. a fan journaled within said fan housing
 h. a motor supported on said fan housing and having driving relationship with said fan,
 i. a speed controller electrically connected to said motor for controlling the speed thereof,
 j. a tachometer connected to said motor for indicating the speed thereof,
 k. a differential pressure gauge inside of the door having a probe extending to the outside face of the door,
 l. rollers attached to the inside face of the main panel,
 m. a side flap slidingly attached to the side of the main panel,
 n. a top flap slidingly attached to the top of the main panel,
 o. each of said flaps having a core,
 p. each of said flaps having a metal plate attached to either side of the core and straddling the main panel,
 q. a corner flap slidingly attached to the top flap,
 r. thumb screws to hold the corner flap in adjusted position,
 s. spring means for biasing the top and side panels outward,
 t. each spring means including a spring within
 u. a tube secured to the main panel,
 v. said springs biasing a plunger outward,
 w. said plunger being telescoped within said tube and attached to one of said flaps,
 x. latch means interconnecting each of the flaps on said main panel for holding the flaps in a retracted position,
 y. rubber seal means extending along the outer edges of the flaps and the exposed edge of the main panel for providing an air seal between the door and the doorway, and
 z. post attached to the outside face of the main panel near the top thereof whereby the air leakage of the house is determined by the motor speed and differential pressure.

* * * * *